United States Patent
Hyun et al.

(10) Patent No.: US 10,244,195 B2
(45) Date of Patent: Mar. 26, 2019

(54) REMOTE CONTROL DEVICE INCLUDING PLURALITY OF INFRARED WINDOWS, AND DISPLAY SYSTEM

(71) Applicant: SAMSUNG ELECTRONICS CO., LTD., Suwon-si, Gyeonggi-do (KR)

(72) Inventors: Sang Min Hyun, Seoul (KR); Gil Jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/792,117

(22) Filed: Oct. 24, 2017

(65) Prior Publication Data
US 2018/0115735 A1    Apr. 26, 2018

Related U.S. Application Data

(60) Provisional application No. 62/438,775, filed on Dec. 23, 2016, provisional application No. 62/411,885, filed on Oct. 24, 2016.

(30) Foreign Application Priority Data

Aug. 22, 2017 (KR) .......................... 10-2017-0106156

(51) Int. Cl.
*H04N 5/44* (2011.01)
*H04B 10/114* (2013.01)
*G08C 23/04* (2006.01)

(52) U.S. Cl.
CPC ........... *H04N 5/4403* (2013.01); *G08C 23/04* (2013.01); *H04B 10/114* (2013.01); *H04N 2005/4417* (2013.01); *H04N 2005/4426* (2013.01)

(58) Field of Classification Search
CPC ......... H04N 2005/4426; H04N 5/4403; H04N 21/42221; H04N 2005/4435; G08C 23/04;
(Continued)

(56) References Cited

U.S. PATENT DOCUMENTS

| 7,956,791 B2* | 6/2011 | Kuo ....................... G08C 19/00 174/372 |
| 8,197,957 B2 | 6/2012 | Shi |

(Continued)

FOREIGN PATENT DOCUMENTS

| CN | 205541410 U | 8/2016 |
| KR | 10-0960525 | 6/2010 |

OTHER PUBLICATIONS

International Search Report dated Feb. 1, 2018 in corresponding International Patent Application No. PCT/KR2017/011677, 5 pgs.
(Continued)

*Primary Examiner* — Mirza F Alam
(74) *Attorney, Agent, or Firm* — Staas & Halsey LLP

(57) ABSTRACT

In accordance with an aspect of the present disclosure, a remote control device includes a first housing; a first transmission circuit for emitting a first infrared light in a direction in which a first face of the first housing; a second transmission circuit for emitting a second infrared light in a direction in which a second face of the first housing; a window for covering at least part of the first transmission circuit and to transmit the first infrared light; a window button for covering at least part of the second transmission circuit and to transmit the second infrared light emitted; and a second housing, wherein the second housing covers a specified region of the first housing if the window button is coupled with hole of the second housing, and exposes the specified region outside the second housing if the window button is separated from the hole.

18 Claims, 9 Drawing Sheets

(58) Field of Classification Search
CPC . H05B 37/0272; H05B 39/088; G06F 3/0362; G11B 19/027
See application file for complete search history.

(56) References Cited

U.S. PATENT DOCUMENTS

| | | | |
|---|---|---|---|
| 9,730,338 B2* | 8/2017 | Wang | H04M 1/0249 |
| 9,734,707 B2 | 8/2017 | Jubilo et al. | |
| 2004/0138768 A1* | 7/2004 | Murray | G09B 25/00 |
| | | | 700/90 |
| 2004/0204059 A1* | 10/2004 | Wong | H04M 1/0212 |
| | | | 455/556.1 |
| 2008/0090618 A1* | 4/2008 | Lim | G06F 1/1626 |
| | | | 455/566 |
| 2010/0009247 A1 | 1/2010 | Shi | |
| 2010/0127912 A1 | 5/2010 | Rye et al. | |
| 2010/0219977 A1* | 9/2010 | Pittard | G08C 17/02 |
| | | | 340/12.22 |
| 2013/0069499 A1 | 3/2013 | Modrell | |
| 2013/0076555 A1* | 3/2013 | Altonen | H01H 9/025 |
| | | | 341/176 |
| 2013/0177318 A1 | 7/2013 | Jubilo et al. | |
| 2015/0221213 A1* | 8/2015 | Altonen | H01H 9/025 |
| | | | 340/12.55 |

OTHER PUBLICATIONS

Written Opinion of the International Searching Authority dated Feb. 1, 2018, in corresponding International Patent Application No. PCT/KR2017/011677, 4 pgs.

\* cited by examiner

REMOTE CONTROL DEVICE INCLUDING PLURALITY OF INFRARED WINDOWS, AND DISPLAY SYSTEM

CROSS-REFERENCE TO RELATED APPLICATION(S)

This application claims priority from an U.S. Provisional Patent Application No. 62/411,885, filed on Oct. 24, 2016 in the United States Patent and Trademark Office and an U.S. Provisional Patent Application No. 62/438,775, filed on Dec. 23, 2016 in the United States Patent and Trademark Office and a Korean Patent Application No. 10-2017-0106156, filed on Aug. 22, 2017 in the Korean Intellectual Property Office, the disclosures of which are hereby incorporated by reference in their entirety.

TECHNICAL FIELD

The present disclosure relate to a technology for expanding an infrared transmission area of a remote control device.

BACKGROUND

A remote control device may emit infrared light in response to a user's key operation. The remote control device may have an infrared window on an upper end thereof and may emit infrared light through the infrared window to an area in the direction in which the upper end of the remote control device is oriented.

A recent remote control device may be configured to integrally control a plurality of external devices. For example, a remote control device may emit infrared light toward a wide area in which a plurality of external devices is provided. In another example, a remote control device may include a plurality of infrared transmission units, or may have a large infrared window.

SUMMARY

Since the infrared window is formed of a translucent material, the large infrared window may expose some of the circuit members provided inward of the infrared window, and thus the beauty of the remote control device may be spoiled.

Aspects of the present disclosure are to address at least the above-mentioned problems and/or disadvantages and to provide at least the advantages described below. Accordingly, an aspect of the present disclosure is to provide a remote control device for solving a problem of spoiling the beauty due to an infrared window, and a display system.

In accordance with an aspect of the present disclosure, a remote control device includes a first housing, a first transmission circuit that includes at least one Light Emitting Diodes and emits infrared light in a direction towards a first face of the first housing, a second transmission circuit that includes at least one Light Emitting Diodes and emits infrared light in a direction towards a second face of the first housing, a window that covers at least part of the first transmission circuit and transmits the infrared light emitted by the first transmission circuit therethrough, a window button that covers at least part of the second transmission circuit and transmits the infrared light emitted by the second transmission circuit therethrough, and a second housing. The second housing may include a hole to be coupled with or to be separated from the window button. The second housing may cover a part of the first housing when the window button is coupled with the hole and may uncover the part of the first housing so that the part of the first housing is exposed outside the second housing when the window button is separated from the hole.

In accordance with another aspect of the present disclosure, a display system includes a display device that includes a display, and a remote control device that remotely controls the display device, and the remote control device includes a first housing, a first transmission circuit that includes at least one Light Emitting Diodes and emits infrared light through a first face of the first housing, a second transmission circuit that includes at least one Light Emitting Diodes and emits infrared light through a second face of the first housing, a window that covers at least part of the first transmission circuit and transmits the infrared light emitted by the first transmission circuit therethrough, a window button that covers at least part of the second transmission circuit and transmits the infrared light emitted by the second transmission circuit therethrough, and a second housing. The second housing may include a hole to be coupled with or to be separated from the window button. The second housing may cover a part of the first housing when the window button is coupled with the hole and may uncover the part of the first housing so that the part of the first housing is exposed outside the second housing when the window button is separated from the hole.

According to embodiments of the present disclosure, it is possible to solve a problem of spoiling the beauty of a remote control device due to an infrared window. In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

Figure 1:
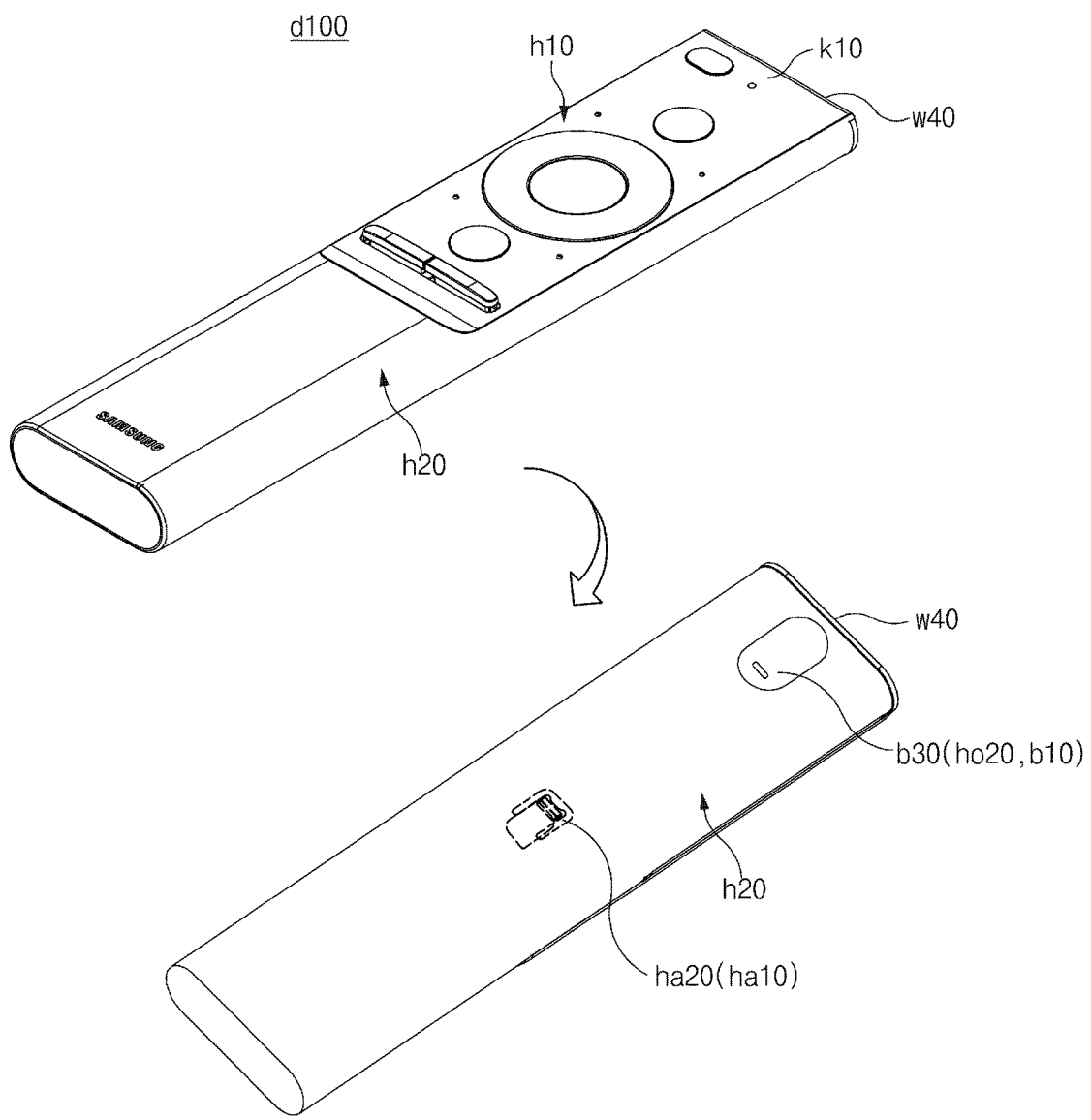
FIG. 1 is a view illustrating front and rear sides of a remote control device in which a specified region of a first housing is covered with a second housing, according to an embodiment.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device FIG. 1 is a view illustrating front and rear sides of a remote control device in which a specified region of a first housing is covered with a second housing, according to an embodiment. The following description taken in conjunction with FIG. 1 will be focused on the state in which the specified region of the first housing is covered with the second housing.

Referring to FIG. 1, a remote control device d100 according to an embodiment may include a first transmission circuit c50 (see FIG. 5), a second transmission circuit c55 (see FIG. 5), a window w40, a keypad k10, a window button b30, a first housing h10, and a second housing h20. The remote control device d100 may be, for example, a remote control device for remotely controlling a display device.

According to an embodiment, the first transmission circuit c50 may emit infrared light in the direction in which a first face of the first housing h10 is oriented. The first transmission circuit c50 may include at least one Light Emitting Diodes. The first transmission circuit c50 may emit infrared light under instruction of a processor (not illustrated). For example, the first transmission circuit c50 may be embedded in or secured to the first housing h10. The first face of the first housing h10 may be, for example, the top face of the first housing h10.

According to an embodiment, the second transmission circuit c55 may emit infrared light in the direction in which a second face of the first housing h10 is oriented. The second transmission circuit c55 may include at least one Light Emitting Diodes. The second transmission circuit c55 may emit infrared light under instruction of the processor (not illustrated). For example, the second transmission circuit c55 may be embedded in or secured to the first housing h10. The second face of the first housing h10 may be, for example, the rear face of the first housing h10.

According to an embodiment, the window w40 may be formed of a material that transmits infrared light. For example, the window w40 may be formed of infrared-transmitting glass. The window w40 may be disposed on the first face of the first housing h10 to cover at least part of the first transmission circuit c50. The window w40 may transmit infrared light emitted by the first transmission circuit c50. The window w40 may be exposed outside the remote control device d100 in the state in which the first housing h10 and the second housing h20 are coupled together. The window w40 may form, for example, a first face of the remote control device d100.

According to an embodiment, the window button b30 may be formed of a material that transmits infrared light. For example, the window button b30 may be formed of infrared-transmitting glass. The window button b30 may be coupled to the second face of the first housing h10 to cover at least part of the second transmission circuit c55. The window button b30 may transmit infrared light emitted by the second transmission circuit c55. For example, the window button b30 may be located in a region of the second face of the first housing h10 that is close to the first face of the first housing h10 (e.g., may be located on an upper side of the second face).

According to an embodiment, the window button b30 may include, for example, a push button that is pressed by pressure. At least a portion of the window button b30 (e.g., a protrusion on an outer face of the window button b30) may protrude outwards through the second face (e.g., the rear face) of the first housing h10 and may be exposed (or protrude) outwards through a second face (e.g., the rear face) of the second housing h20. For example, the at least a portion of the window button b30 may be exposed outside the second housing h20 through a hole ho10 of the first housing h10 and a hole ho20 of the second housing h20. Accordingly, the window button b30 may be coupled with the second housing h20 through the hole ho20 of the second housing h20. If the window button b30 is pressed by an external force (e.g., a force applied by a user), the window button b30 may be separated from the hole ho20 of the second housing h20.

According to an embodiment, the keypad k10 may be disposed on a third face (e.g., the front face) of the first housing h10. The keypad k10 may be exposed outside the remote control device d100 such that the keypad k10 may be operated by the user. The keypad k10 may include a keypad member and a keypad circuit. The keypad member may include at least one key that is operated by the user. The keypad circuit may be provided below the keypad member to sense a user input according to operation of the keypad member. The sensed user input may be transferred to the processor (not illustrated), and the processor (not illustrated) may emit infrared light by using the first and second transmission circuits c50 and c55 in response to the user input.

According to an embodiment, the first housing h10 may include a plurality of faces including the first to third faces. Each face of the first housing h10 may include at least one of a flat face or a curved face.

Circuit members may be received in an inner space of the first housing h10 that is protected by the plurality of faces of the first housing h10. The circuit members may include, for example, the first transmission circuit c50, the second transmission circuit c55, the processor (not illustrated), a printed circuit board, and the like. The printed circuit board may be provided between the second face and the third face (e.g., the front face) of the first housing h10 and may have the first transmission circuit c50, the second transmission circuit c55, the processor (not illustrated), the keypad circuit, or the like mounted thereon.

The first face (e.g., the top face) of the first housing h10 may be coupled with the window w40, or may be formed of the window w40. The first housing h10 may have the hole ho10 formed in the second face (e.g., the rear face) thereof, and the hole ho10 may be coupled with the window button b30. A specified region, which may be, for example, a battery-receiving space s10 may be formed on the third face of the first housing h10. The keypad k10 may be disposed on or coupled to the third face of the first housing h10. The battery-receiving space s10 may be a space in which a battery is received. If a battery is mounted in the battery-receiving space s10, the battery may be electrically connected with the circuit members to supply power to each circuit member. At least a portion of the first housing h10 may be inserted into an inner space of the second housing h20.

According to an embodiment, the second housing h20 may be coupled with the first housing h10 such that at least a portion of the window w40, the keypad k10, or the window button b30 is exposed. For example, the second housing h20 may be configured to surround faces other than the first face of the first housing h10. Furthermore, the second housing h20 may include an opening, and the first face (or the window w40) of the first housing h10 and the keypad k10 may be exposed through the opening. The second housing h20 may have the hole ho20 formed in the second face thereof, and the hole ho20 may be coupled with the window button b30.

According to an embodiment, the second housing h20 may cover a specified region of the first housing h10 in the state in which the window button b30 is coupled with the hole ho20 of the second housing h20. The specified region may include, for example, at least a portion of the battery-receiving space s10. For example, in the state in which the window button b30 is coupled with the hole ho20 of the second housing h20, the battery-receiving space s10 of the first housing h10 may be closed.

According to an embodiment, the first housing h10 and the second housing h20 may be coupled together by using at least one guide member g10 and g20, in addition to the window button b30 and the hole ho20. The at least one guide member g10 and g20 will be described below in conjunction with FIG. 2.

The remote control device d100 according to an embodiment may include a plurality of infrared transmission circuits and a plurality of infrared windows and thus may expand an infrared transmission radius. Furthermore, one of the plurality of infrared windows may be integrated with a button (e.g., the window button b30), thereby reducing space for implementing an infrared window and solving a problem of spoiling the beauty of the remote control device d100.

The remote control device d100 according to an embodiment may include a button for opening or closing the battery-receiving space s10, and the button may be implemented to be an infrared window, thereby reducing space for application of the button.

Figure 2:
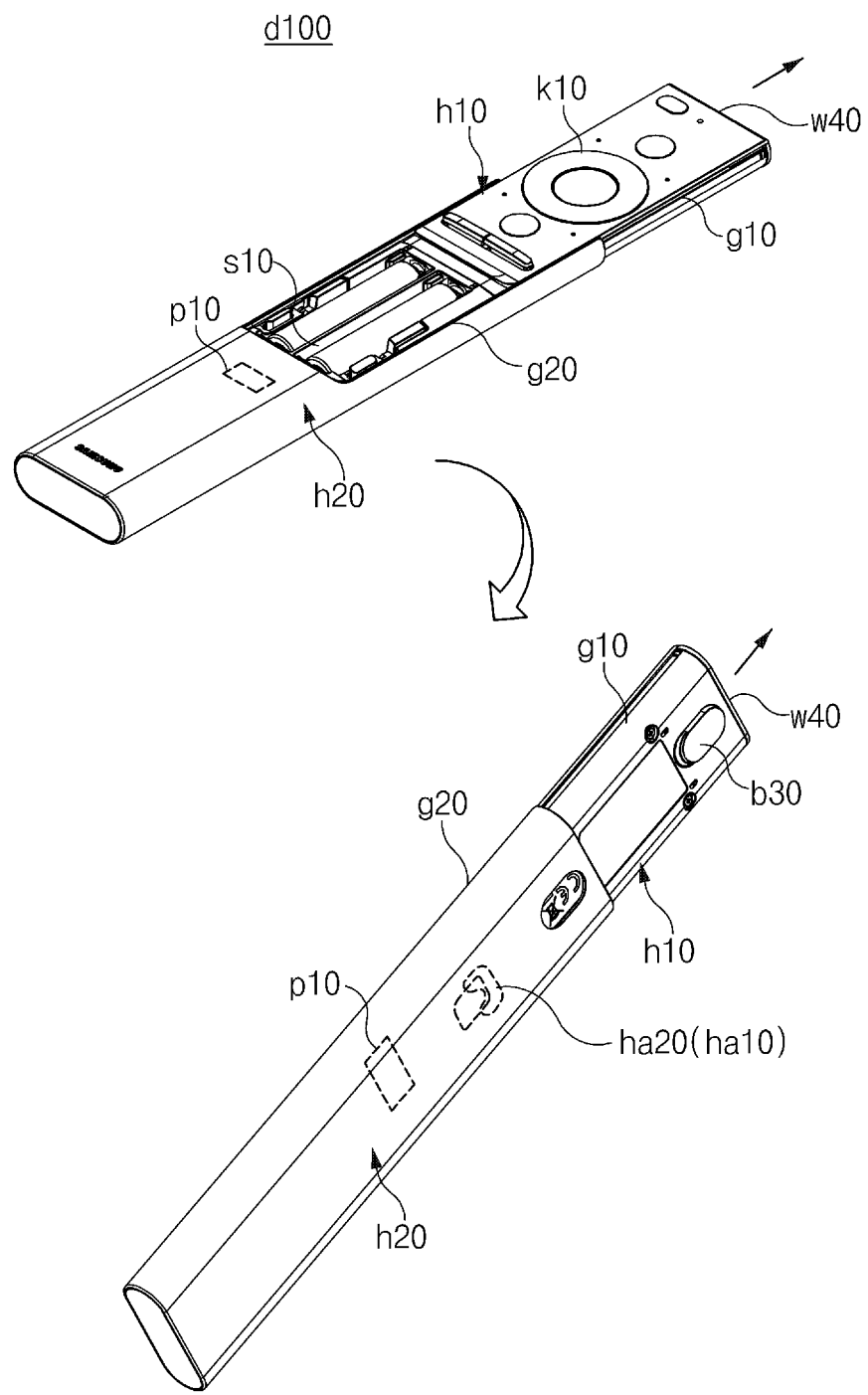
FIG. 2 is a view illustrating the front and rear sides of the remote control device in which the specified region of the first housing is exposed outside the second housing, according to an embodiment.

FIG. 2 is a view illustrating the front and rear sides of the remote control device in which the specified region of the first housing is exposed outside the second housing, according to an embodiment.

Referring to FIG. 2, according to an embodiment, if the window button b30 is pressed by an external force in the state in which the window button b30 is coupled with the hole ho20, at least a portion of the window button b30 may escape from the hole ho20 of the second housing h20, and thus the window button b30 may be separated from the hole ho20 of the second housing h20.

According to an embodiment, a push member p10 may be disposed on a sixth face (e.g., the bottom face) of the first housing h10 or on an inner face of the second housing h20 (hereinafter, referred to as the inner face of the second housing h20) that corresponds to the sixth face of the first housing h10. While FIG. 2 illustrates that the push member p10 is provided on the sixth face of the first housing h10, the position of the push member p10 is not limited thereto. However, in the following description, it will be exemplified that the push member p10 is provided on the sixth face of the first housing h10.

The push member p10 may exert a repulsive force toward the inner face of the second housing h20 opposite the sixth face of the first housing h10. The push member p10 may be configured to have an elastic force and may be configured to be pressed in the direction in which the first face of the first housing h10 is oriented. For example, the push member p10 may include at least one spring member.

The repulsive force of the push member p10 may be relatively smaller than a force by which the window button b30 holds the second housing h20. Accordingly, if the first housing h10 is inserted into the inner space of the second housing h20 and the window button b30 is coupled with the hole ho20 of the second housing h20, the push member p10 may remain pressed by the inner face of the second housing h20. In contrast, if the window button b30 is pressed and then separated from the hole ho20 of the second housing h20, the push member p10 may exert a repulsive force toward the inner face of the second housing h20 that faces the push member p10.

If the window button b30 is separated from the hole ho20, a specified region of the first housing h10 may escape from the inner space of the second housing h20 in the direction in which the first face of the first housing h10 is oriented, due to the reaction to the repulsive force of the push member p10, and may be exposed outside the second housing h20. The specified region may include, for example, at least a portion of the battery-receiving space s10. For example, in the state in which the window button b30 is separated from the hole ho20 of the second housing h20, at least a portion of the battery-receiving space s10 of the first housing h10 may be opened outside the second housing h20 from the inner space of the second housing h20. At this time, a portion of the first housing h10 (e.g., an upper region of the keypad k10) may be spaced apart from the second housing h20.

Thereafter, if a user pushes the first face of the first housing h10 to exert an external force in the direction from the first face to the sixth face of the first housing h10, the first housing h10 may be inserted into the inner space of the second housing h20 again. Then, the push member p10 may be pressed by the inner face of the second housing h20 in the direction in which the first face of the first housing h10 is oriented.

According to an embodiment, the first housing h10 and the second housing h20 may be coupled together by using the at least one guide member g10 and g20, in addition to the window button b30 and the hole ho20. For example, the plurality of first guide members g10 (see FIG. 2) may be provided on a fourth face (e.g., the right side face) and a fifth face (e.g., the left side face) of the first housing h10 adjacent to the second housing h20. The plurality of second guide members g20 may be provided on fourth and fifth faces of the second housing h20 that are adjacent to the fourth and fifth faces of the first housing h10, respectively. The plurality of first guide members g10 and the plurality of second guide members g20 may couple at least a portion of the fourth and fifth faces of the first housing h10 and at least a portion of the fourth and fifth faces of the second housing h20.

According to an embodiment, the at least one guide member g10 and g20 may guide a path along which the first housing h10 escapes from the inner space of the second housing h20 when the window button b30 is separated from the hole ho20. For example, each first guide member g10 may be a groove with a specified length that is formed in a first direction. A first end of the groove may be open, and a second end of the groove may be closed. Each second guide member g20 may be a protrusion that is formed in the first direction to correspond to the groove. The first direction may be, for example, a direction from the first face to the sixth face of the first housing h10. The specified length may correspond to the length by which the first housing h10 escapes from the second housing h20.

In the process in which the specified region of the first housing h10 escapes from the inner space of the second housing h20, the first guide member g10 mounted on the second guide member g20 may slide in the direction in which the first face of the first housing h10 is oriented, and thus a portion of the first guide member g10 may be exposed outside the second housing h20.

In the process in which the first housing h10 is inserted into the inner space of the second housing h20, the first guide member g10 mounted on the second guide member g20 may slide in the direction from the first face to the sixth face of the first housing h10, and thus the first guide member g10 may be covered with the second housing h20.

According to an embodiment, at least one of the first and second housings h10 and h20 may include stoppers ha10 and ha20. The stoppers ha10 and ha20 may allow the first housing h10 to slide within a specified distance. For example, the stoppers ha10 and ha20 may restrict the distance by which the first housing h10 escapes from the second housing h20 to the specified distance or less in the process in which the window button b30 is separated from the hole ho20 of the second housing h20 and then the first housing h10 escapes from the second housing h20 by a repulsive force of the push member p10. For example, the first housing h10 may include the first stopper ha10, and the second housing h20 may include the second stopper ha20. The second stopper ha20 may be a recess having a predetermined shape (e.g., a rectangular shape), and the first stopper ha10 may be a protrusion having a predetermined shape (e.g., the shape of "⊂") that is inserted into the recess having a predetermined shape. The first stopper ha10 may be configured to have an elastic force and may allow the first housing h10 to escape from the second housing h20 by the specified distance. For example, the first stopper ha10 may have an elastic force in a second direction. The second direction may be a direction from the first face to the second face of the first housing h10. For example, the first stopper ha10 may have a first length in the state in which the first housing h10 is inserted into the second housing h20, and may have a second length in the state in which the first housing h10 has escaped from the inner space of the second housing h20 by the specified distance. The second length exceeding the first length may be, for example, a length corresponding to the specified distance. As described above, the first stopper ha10 may be coupled with the second stopper ha20 to restrict the distance by which the first housing h10 escapes from the second housing h20, thereby preventing the first housing h10 from being completely separated from the second housing h20.

In the above-described embodiment, the plurality of first guide members g10, the plurality of second guide members g20, and the at least one stopper ha10 and ha20 may allow the battery-receiving space s10 to be sufficiently opened. For example, the plurality of first guide members g10, the plurality of second guide members g20, and the at least one stopper ha10 and ha20 may allow the battery-receiving space s10 to be opened to an extent sufficient to mount a battery in the battery-receiving space s10.

In the above-described embodiment, the window button b30 is integrated into the button for opening or closing the battery-receiving space s10. However, alternatively, the window button b30 may be configured to open or close a receiving space for receiving at least one circuit member other than a battery (e.g., the inner space of the first housing h10).

In the above-described embodiment, the second housing h20 is configured to surround the faces other than the first face of the first housing h10. However, alternatively, the second housing h20 may be configured to surround only the second face of the first housing h10. In this case, the battery-receiving space s10 may be formed on the second face of the first housing h10. Further, the push member p10 and the at least one guide member g10 and g20 may be provided between the second face of the second housing h20 and the first housing h10 and may be configured to support the aforementioned functions.

Figure 3:
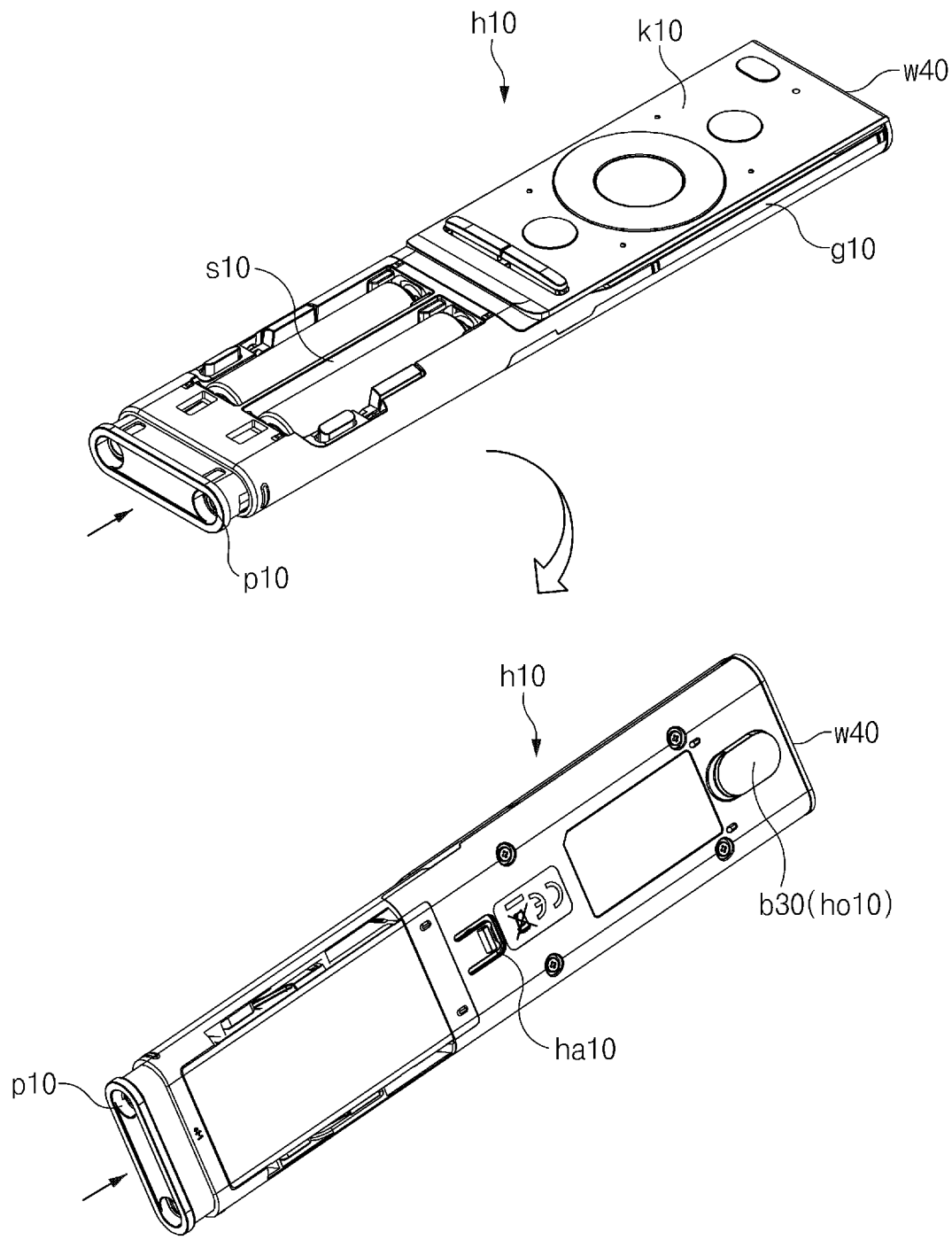
FIG. 3 illustrates a front perspective view and a rear perspective view of the first housing, according to an embodiment.

FIG. 3 illustrates a front perspective view and a rear perspective view of the first housing, according to an embodiment. For the convenience of description, FIG. 3 illustrates the first housing h10 completely separated from the second housing h20.

Referring to FIG. 3, according to an embodiment, the window w40 may be disposed on the first face of the first housing h10. For example, the window w40 may form the first face of the first housing h10.

According to an embodiment, the window button b30 may be provided on the second face of the first housing h10. At least an operating region of the window button b30 may be exposed outside the second housing h20 to allow a user to operate the window button b30. For example, the window button b30 may be located in a region of the second face of the first housing h10 that is close to the first face of the first housing h10.

According to an embodiment, the battery-receiving space s10 in which to receive a battery may be formed on the third face of the first housing h10. The keypad k10 may be additionally disposed on the third face of the first housing h10.

According to an embodiment, the plurality of first guide members g10 may be formed on the fourth and fifth faces (e.g., the opposite lateral faces) of the first housing h10. Each first guide member g10 may be a long groove. A first end of the groove may be open, and a second end of the groove may be closed. The first guide members g10 may be coupled with the second guide members g20, respectively, to guide a portion of the first housing h10 coupled with or separated from the second housing h20.

According to an embodiment, the first housing h10 may further include the stopper ha10. The stopper ha10 may restrict the extent to which the first housing h10 is separated from the second housing h20 to allow the first housing h10 to slide on the second housing h20 by a specified distance or less in the state in which the window button b30 is pressed and then separated from the hole ho20 of the second housing h20. For example, the stopper ha10 may close the second ends of the plurality of first guide members g10.

According to an embodiment, the push member p10 may be coupled to the sixth face of the first housing h10 to exert a repulsive force in the direction in which the sixth face of the first housing h10 is oriented. The push member p10 may be configured to have an elastic force and may be configured to be pressed in the direction in which the first face of the first housing h10 is oriented. Since the repulsive force of the push member p10 is relatively smaller than a force by which the window button b30 holds the second housing h20, the repulsive force may be cancelled by the force by which the window button b30 holds the second housing h20, in the state in which the window button b30 is coupled with the hole ho20. Accordingly, the push member p10 may remain pressed by the inner face of the second housing h20 in the state in which the window button b30 is coupled with the hole ho20. In this case, the battery-receiving space s10 of the first housing h10 may be covered with the second housing h20.

In contrast, if the window button b30 is separated from the hole ho20, the repulsive force of the push member p10 may be exerted toward the inner face of the second housing h20. If the repulsive force of the push member p10 is exerted toward the inner face of the second housing h20, the second housing h20 may be pushed in the direction in which the sixth face (e.g., the bottom face) of the first housing h10 is oriented, or the first housing h10 may be pushed in the direction in which the first face (e.g., the top face) of the first housing h10 is oriented. Since the second housing h20 is carried by a user or placed on the ground, the user may feel as if the first housing h10 is pushed in the direction in which the first face (e.g., the top face) of the first housing h10 is oriented in the state in which the window button b30 is separated from the hole ho20. If the first housing h10 is moved by the repulsive force of the push member p10 in the direction in which the first face of the first housing h10 is oriented, the battery-receiving space s10 may be exposed outside the second housing h20.

The push member p10 may be configured to evenly exert a repulsive force on the inner face of the second housing h20. For example, the push member p10 may have a shape corresponding to the inner face of the second housing h20 and may have a size of more than half the inner face of the second housing h20. In another example, the push member p10 may have a size of more than half the sixth face of the first housing h10 and may exert a repulsive force on an area over half the inner face of the second housing h20. The push member p10 may be configured to have an elastic force and may exert a repulsive force on the inner face of the second housing h20 by using the elastic force.

Figure 4:
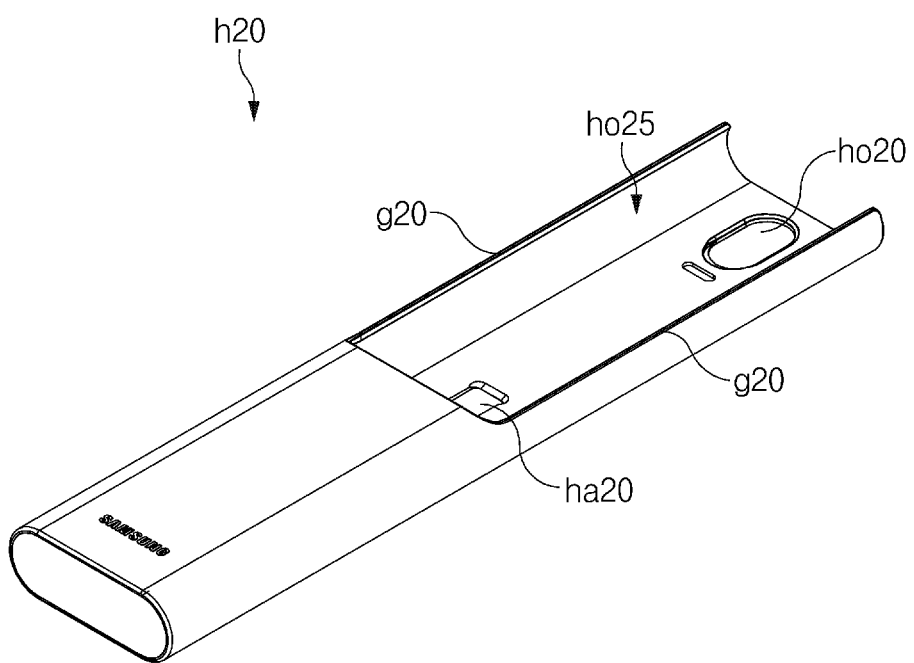
FIG. 4 illustrates a front perspective view of the second housing, according to an embodiment.

FIG. 4 illustrates a front perspective view of the second housing, according to an embodiment. For the convenience of description, FIG. 4 illustrates the second housing h20 to which the first housing h10 is not coupled.

Referring to FIG. 4, according to an embodiment, the second housing h20 may include an opening ho25 and the hole ho20.

According to an embodiment, the second housing h20 may be configured to surround the faces other than the first face (top face) of the first housing h10. For example, the second housing h20 may be configured to surround the sixth face (e.g., the bottom face) of the first housing h10, a portion of the third face (e.g., the front face) of the first housing h10, the fourth face (e.g., the left side face) and the fifth face (e.g., the right side face) of the first housing h10, and a region of the second face of the first housing h10, except at least a portion of the window button b30. Since the second housing h20 exposes the first face of the first housing h10, the first housing h10 may escape from the inner space of the second housing h20 in the direction in which the first face of the first housing h10 is oriented.

The second housing h20 may include the opening ho25, and at least a portion of the window w40 and the operating region of the keypad k10 of the first housing h10 may be exposed outside the second housing h20 through the opening ho25. The opening ho25 may be a region through which the second housing h20 exposes the first housing h10.

According to an embodiment, the hole ho20 may have a shape and size corresponding to the shape and size of the window button b30. The hole ho20 may be coupled with the window button b30 before the window button b30 is operated, and may be separated from the window button b30 when the window button b30 is operated.

The battery-receiving space s10 may be open through the opening ho25 if the window button b30 is separated from the hole ho20 of the second housing h20, and the first housing h10 escapes from the inner space of the second housing h20.

According to an embodiment, the second housing h20 may include the plurality of second guide members g20 in the regions thereof corresponding to the plurality of first guide members g10 provided on the first housing h10. For example, the plurality of second guide members g20 may be formed on the opposite lateral faces of the second housing h20. The second guide members g20 may be protrusions formed in the first direction in the regions of the second housing h20 that are adjacent to the opposite lateral faces of the keypad k10. The first guide members g10 may be mounted and slide on the second guide members g20, respectively, to guide a path along which the first housing h10 is separated from or inserted into the inner space of the second housing h20.

The second housing h20 may include the second stopper ha20 and may restrict the distance by which the first housing h10 escapes from the inner space of the second housing h20 to a specified distance or less by using the second stopper ha20. The second stopper ha20 may be, for example, a recess having a predetermined shape (e.g., a rectangular shape). Since the second stopper ha20 has been described above, a detailed description thereof will be omitted. Hereinafter, a coupled state of the first housing h10 and the second housing h20 depending on whether the window button b30 is operated, according to an embodiment, will be described with reference to FIGS. 5 to 7. The following descriptions taken in conjunction with FIGS. 5 to 7 will be focused on a structure in which the window button b30 formed of a hard material is pressed by an external force and then separated from the hole ho20, and a repulsive force of the push member p10.

Figure 5:
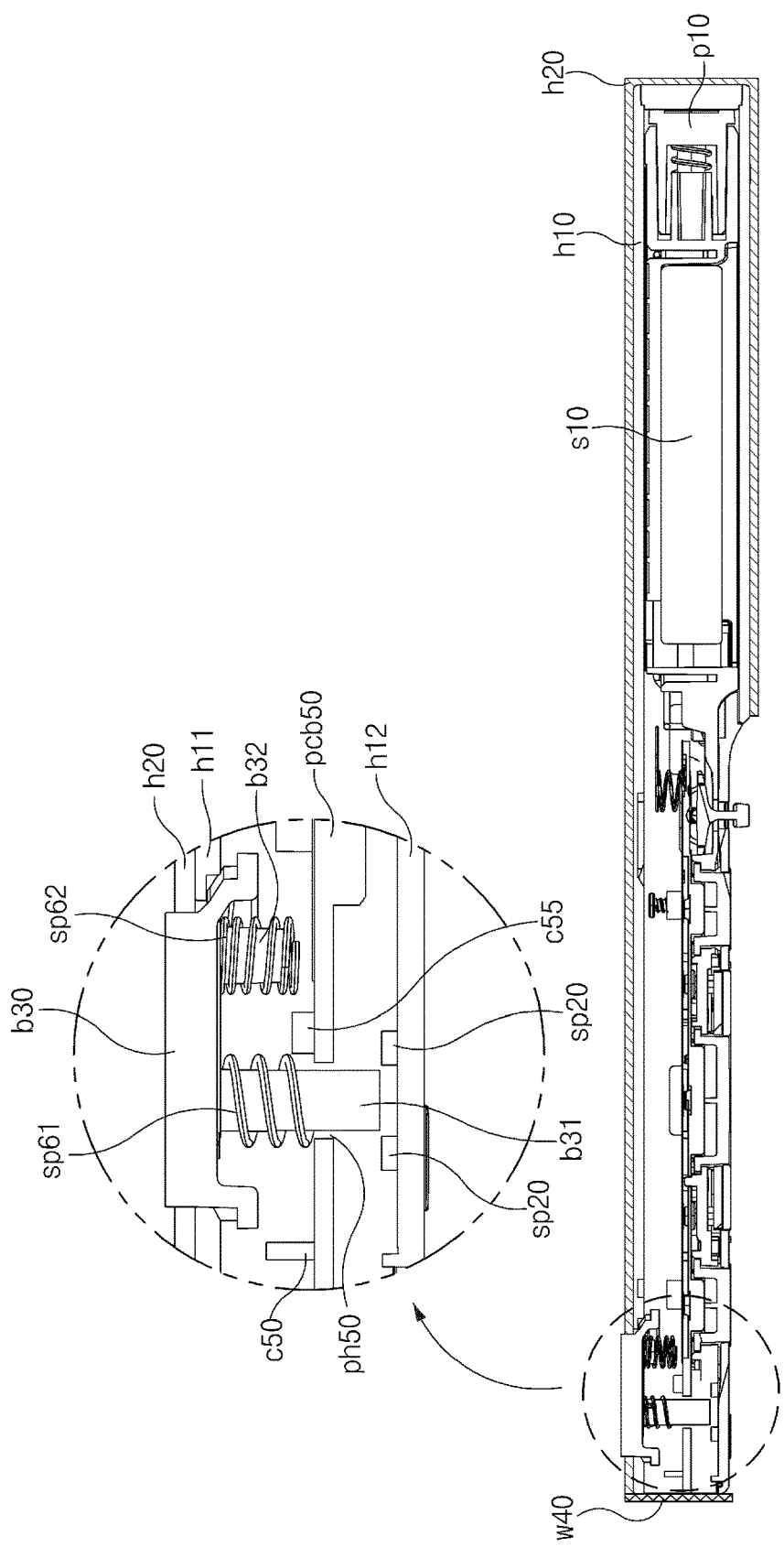
FIG. 5 is a sectional view of the remote control device for explaining a coupled state of the first housing and the second housing when a window button is not operated, according to an embodiment.

FIG. 5 is a sectional view of the remote control device for explaining a coupled state of the first housing and the second housing when the window button is not operated, according to an embodiment.

Referring to FIG. 5, according to an embodiment, the window button b30 may include at least one protrusion b31 and b32 on the inside thereof. In this disclosure, it will be exemplified that the window button b30 includes the first protrusion b31 and the second protrusion b32. However, the window button b30 is not limited thereto.

According to an embodiment, the first protrusion b31 and the second protrusion b32 may be disposed on an inner face of the window button b30 so as to be spaced apart from each other with a predetermined interval therebetween. For example, the first protrusion b31 may be formed to be longer than the second protrusion b32. The first protrusion b31 and the second protrusion b32 may have, for example, a cylindrical shape.

According to an embodiment, a first end of the first protrusion b31 may be coupled to the inner face of the window button b30, and a second end of the first protrusion b31 may be spaced apart from the inside of the third face h12 of the first housing h10 with a predetermined interval therebetween. The first protrusion b31 may pass through a hole ph50 of a printed circuit board pcb50 and may be inserted into a support member sp20. The printed circuit board pcb50 may be located between the second face h11 and the third face h12 of the first housing h10 and may have the first transmission circuit c50 and the second transmission circuit c55 mounted thereon. The first transmission circuit c50 may be mounted on, for example, a first region of the printed circuit board pcb50 that is close to the first face of the first housing h10. The second transmission circuit c55 may be mounted on, for example, a second region of the printed circuit board pcb50 between the first protrusion b31 and the second protrusion b32.

According to an embodiment, a first end of the second protrusion b32 may be coupled to the inner face of the window button b30, and a second end of the second protrusion b32 may be spaced apart from the printed circuit board pcb50 with a predetermined interval therebetween.

According to an embodiment, a first elastic member sp61 and a second elastic member sp62 may be mounted on the first protrusion b31 and the second protrusion b32, respectively. In the state in which the window button b30 is coupled with the hole ho20 of the second housing h20, the first elastic member sp61 and the second elastic member sp62 may exert an elastic force on the bottom of the window button b30 to support the window button b30, thereby resulting in at least a portion of the window button b30 being inserted into the hole ho20 of the second housing h20. The first and second elastic members sp61 and sp62 may have shapes corresponding to the first and second protrusions b31 and b32, respectively. For example, the first and second elastic members sp61 and sp62 may be helical springs.

According to an embodiment, the support member sp20 may be formed on the inside of the third face of the first housing h10 to support at least one of the first protrusion b31 and the first elastic member sp61. For example, the support member sp20 may make contact with a plurality of portions on the periphery of the first protrusion b31 to support the plurality of portions on the periphery of the first protrusion b31. In another example, the support member sp20 may make contact with a plurality of portions on the periphery of the first elastic member sp61 to support the plurality of portions on the periphery of the first elastic member sp61.

In FIG. 5, the support member sp20 is illustrated as supporting the first protrusion b31. However, alternatively, the support member sp20 may support at least one of the first protrusion b31 or the first elastic member sp61 to prevent a movement of at least one of the first protrusion b31 or the first elastic member sp61. The support member sp20 may have, for example, an annular shape and may include, in the center thereof, a recess having a shape corresponding to the first protrusion b31 (or the first elastic member sp61). In the case where the support member sp20 supports the first elastic member sp61, the first elastic member sp61 may have a length by which a plurality of portions on the periphery of the first elastic member sp61 make contact with the support member sp20. Furthermore, the hole ph50 of the printed circuit board pcb50 may have a size sufficient to pass the first elastic member sp61.

Figure 6:
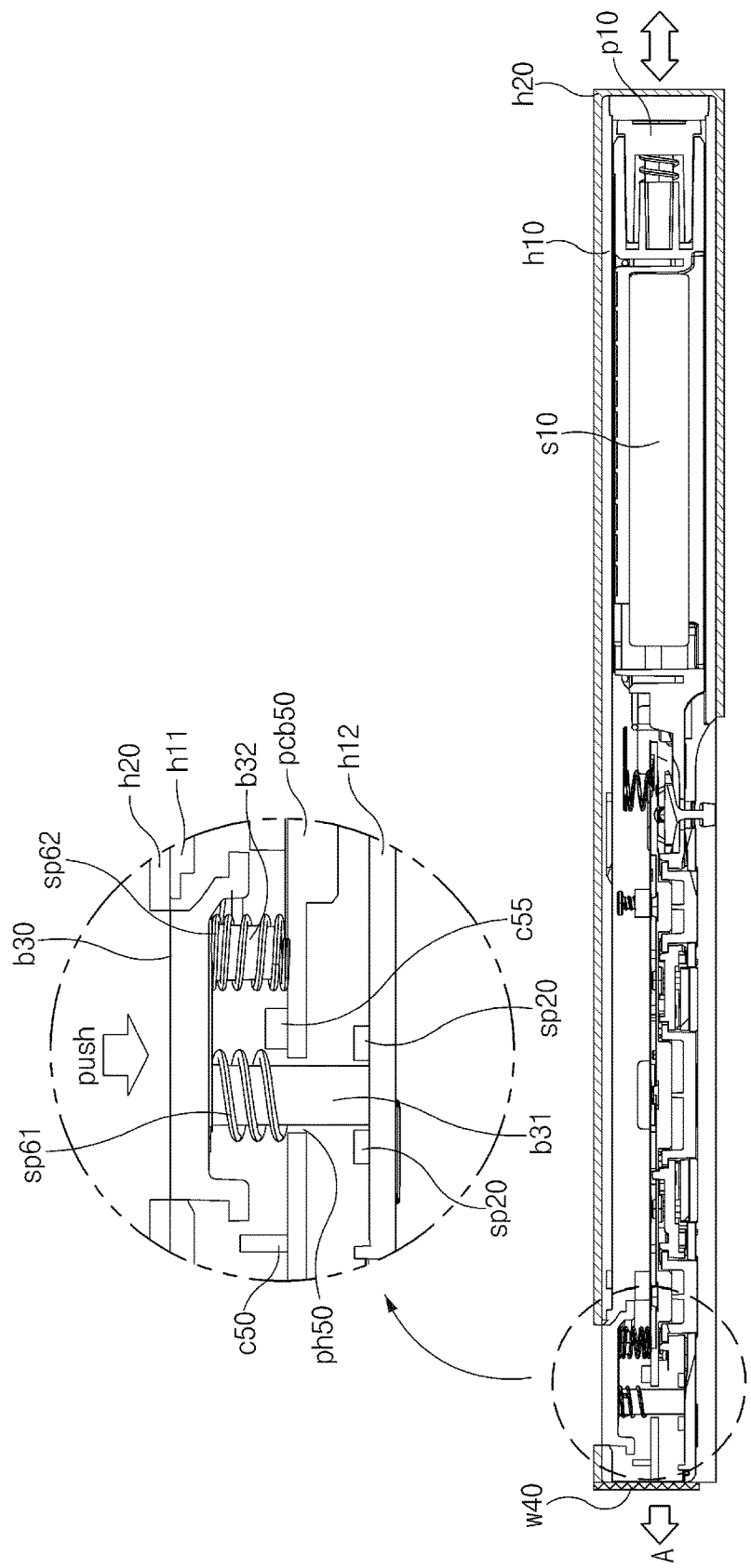
FIG. 6 is a sectional view of the remote control device for explaining a coupled state of the first housing and the second housing when the window button is operated, according to an embodiment.

FIG. 6 is a sectional view of the remote control device for explaining a coupled state of the first housing and the second housing when the window button is operated, according to an embodiment.

Referring to FIG. 6, if the window button b30 is pressed, the first elastic member sp61 and the second elastic member sp62 may be compressed to a lower side of the window button b30, and at least a portion of the window button b30 may be separated from the hole ho20 of the second housing h20.

If the window button b30 is separated from the hole ho20 of the second housing h20, a repulsive force of the push member p10 may be exerted in the direction in which the sixth face of the first housing h10 is oriented (see the double arrow in FIG. 6). Due to a reaction to the repulsive force of the push member p10, the first housing h10 may move in the direction in which the first face of the first housing h10 is oriented, and may thus escape from the inner space of the second housing h20.

Figure 7:
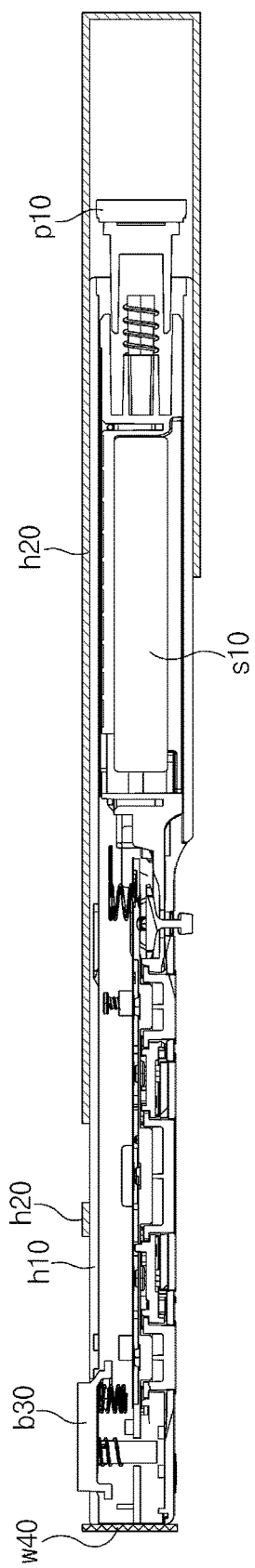
FIG. 7 is a sectional view of the remote control device in the case where a battery-receiving space of the first housing has escaped from an inner space of the second housing, according to an embodiment.

FIG. 7 is a sectional view of the remote control device in the case where the battery-receiving space of the first housing has escaped from the inner space of the second housing, according to an embodiment.

Referring to FIG. 7, if the first housing h10 escapes from the inner space of the second housing h20 due to the repulsive force of the push member p10, at least a portion of the battery-receiving space s10 may be exposed outside the second housing h20.

If the first housing h10 escapes from the inner space of the second housing h20, the window button b30 may protrude outside the hole ho10 of the first housing h10 again due to the elastic force of the first and second elastic members sp61 and sp62.

While FIGS. 5 to 7 illustrate the first and second protrusions b31 and b32 having different shapes, the first and second protrusions b31 and b32 may be configured in the same structure. For example, the second protrusion b32 may be configured in the above-described structure of the first protrusion b31.

Figure 8:
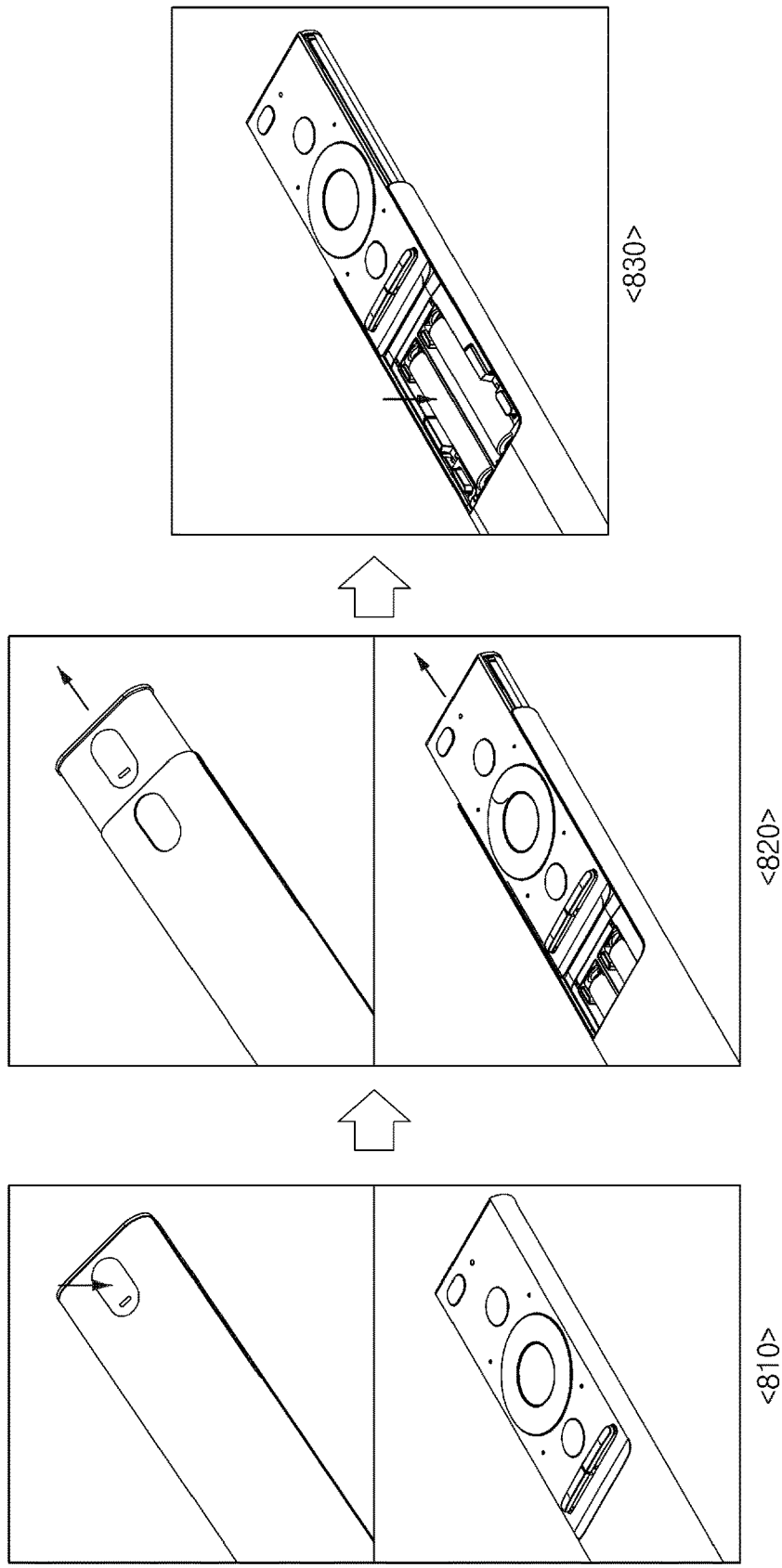
FIG. 8 illustrates a process of separating the battery-receiving space of the remote control device, according to an embodiment.

FIG. 8 illustrates a process of separating the battery-receiving space of the remote control device, according to an embodiment.

Referring to FIG. 8, in state 810, the window button b30 may be pressed according to a user operation (a push operation).

In state 820, the window button b30 may be separated from the hole ho20 if the window button b30 is pressed, and the first housing h10 may escape in the direction which the first face of the first housing h10 is oriented, due to a repulsive force of the push member p10 that is exerted on the inner face of the second housing h20. In this case, at least a portion of the battery-receiving space s10 may be opened. However, the extent to which the first housing h10 escapes from the inner space of the second housing h20 due to the repulsive force of the push member p10 may be limited. In this case, the battery-receiving space s10 may not be opened sufficiently to mount a battery in the battery-receiving space s10.

In state 830, if a user additionally applies an attractive force to the first face of the first housing h10, the battery-receiving space s10 may be opened sufficiently to receive a battery in the battery-receiving space s10.

Figure 9:
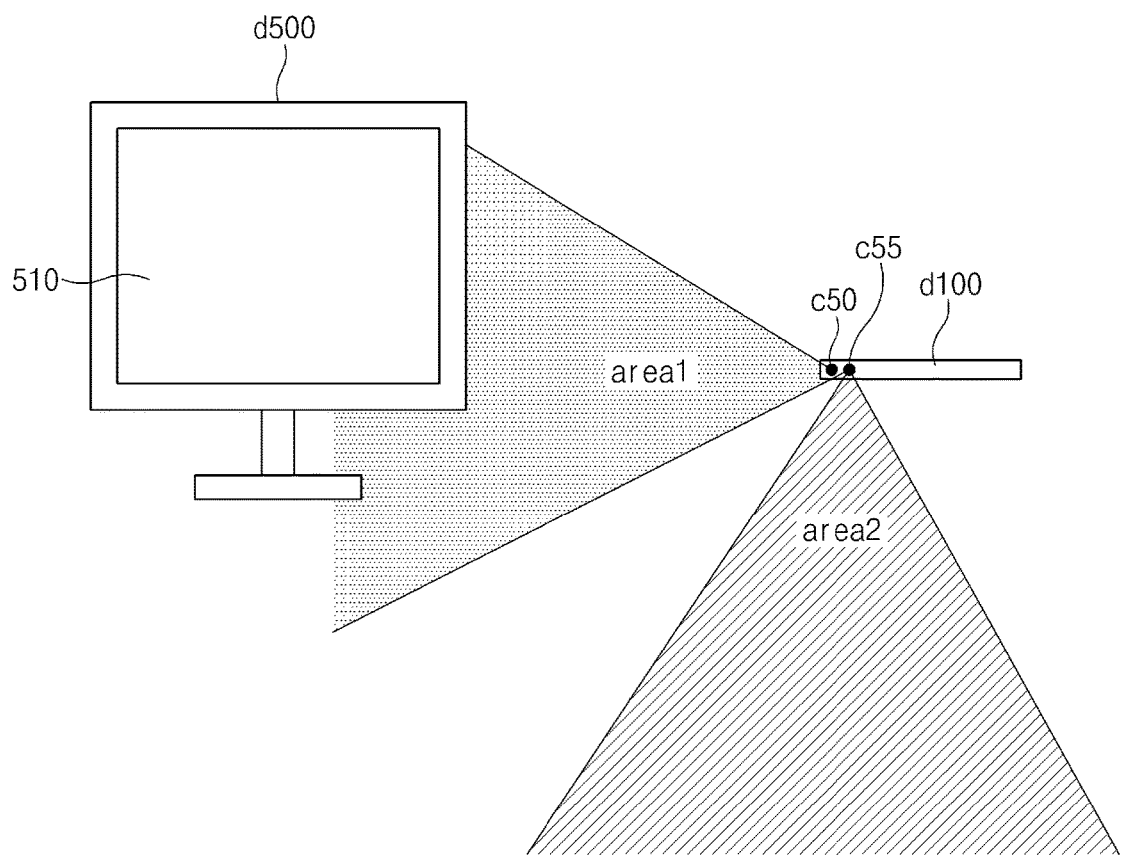
FIG. 9 illustrates a display system according to an embodiment.

FIG. 9 illustrates a display system according to an embodiment.

Referring to FIG. 9, the display system according to an embodiment may include a display device d500 and the remote control device d100.

According to an embodiment, the display device d500 may include a receiver (not illustrated), a display 510, and a processor (not illustrated). The receiver (not illustrated) may receive a signal from at least one of the first and second transmission circuits c50 and c55 included in the remote control device d100. The display 510 may include, for example, a liquid crystal display (LCD), a light-emitting diode (LED) display, an organic light-emitting diode (OLED) display, or an electronic paper display. The display 510 may display, for example, various contents (e.g., text, an image, a video, an icon, a symbol, and/or the like) to a user. The processor (not illustrated) may perform operations or data processing associated with control and/or communication of at least one other element of the display device d500.

According to an embodiment, the remote control device d100 may include a first housing (e.g., the first housing h10 of FIG. 5), a plurality of transmission circuits (e.g., the transmission circuits c50 and c55 of FIG. 5), a window (e.g., the window w40 of FIG. 5), a window button (e.g., the window button b30 of FIG. 5), and a second housing (e.g., the second housing h20 of FIG. 5). The remote control device d100 may expand areas area 1 and area 2 to which infrared light is emitted, through the plurality of transmission circuits (e.g., the transmission circuits c50 and c55 of FIG. 5). Since the remote control device d100 has been described above, a detailed description thereof will be omitted.

The remote control device d100 according to an embodiment may transmit infrared light toward the display device d500 even when the user operates the keypad (e.g., the keypad k10 of FIG. 1) of the remote control device d100 in an upright position for voice recognition.

According to an embodiment, a remote control device may include a first housing; a first transmission circuit configured to emit infrared light in a direction in which a first face of the first housing is oriented; a second transmission circuit configured to emit infrared light in a direction in which a second face of the first housing is oriented; a window configured to cover at least part of the first transmission circuit and to transmit infrared light emitted by the first transmission circuit; a window button configured to cover at least part of the second transmission circuit and to transmit infrared light emitted by the second transmission circuit; and a second housing, wherein the second housing includes a hole coupled with the window button, and wherein the second housing is configured to cover a specified region of the first housing in a state in which the window button is coupled with the hole, and to expose the specified region of the first housing outside the second housing in a state in which the window button is separated from the hole.

According to an embodiment, wherein the window is coupled to the first face of the first housing, wherein the window button is coupled to the second face of the first housing, and wherein the second housing is configured to expose at least a portion of the window and at least a portion of the window button outside the second housing.

According to an embodiment, wherein the specified region includes space in which a battery is received, wherein the space is closed in the state in which the window button is coupled with the hole, and wherein at least part of the space is open in the state in which the window button is separated from the hole According to an embodiment, wherein the second housing is configured to surround faces other than the first face of the first housing, and wherein the specified region of the first housing is formed in a region other than the first face of the first housing.

According to an embodiment, a remote control device further may include a keypad member coupled with a third face of the first housing, wherein the first face is a first side face of the first housing, wherein the second face is a rear face of the first housing, and wherein the third face is a front face of the first housing.

According to an embodiment, wherein at least a portion of the window button protrudes outside the second face of the first housing and is exposed outside the second housing, wherein the second housing covers the specified region of the first housing if the at least a portion of the window button is inserted into the hole, and wherein the at least a portion of the window button is separated from the hole, and the second housing exposes the specified region of the first housing to the outside if the at least a portion of the window button is pressed.

According to an embodiment, wherein the window button includes at least one protrusion on an inner face of the window button, wherein the remote control device further comprises at least one elastic member mounted on each protrusion, and wherein each elastic member supports the window button to allow the at least a portion of the window button to be inserted into the hole in the state in which the at least a portion of the window button is coupled with the hole, and the each elastic member is compressed to allow the at least a portion of the window button to be separated from the hole of the second housing in the state in which the at least a portion of the window button is pressed.

According to an embodiment, wherein a support member is formed inside the first housing, the support member being configured to prevent a movement of the at least one elastic member.

According to an embodiment, the remote control device may further include a push member disposed on a third face of the first housing, wherein the push member is configured to push the second housing in a direction in which an inner face of the second housing opposite the third face of the first housing is oriented.

According to an embodiment, the remote control device may further include a first guide member disposed on at least one face of the first housing; and a second guide member disposed on at least one face of the second housing, wherein one of the first and second guide members is a groove formed in a first direction, wherein the other of the first and second guide members is a protrusion formed in the first direction, and wherein the first and second guide members provide a structure to guide sliding of the first housing in the direction in which the first face of the first housing is oriented, in the state in which the window button is separated from the hole.

According to an embodiment, the remote control device may further include at least one stopper disposed on at least one of the first and second housings, wherein the at least one stopper is configured to allow the first housing to slide within a specified distance.

According to an embodiment, wherein the second housing is configured to surround the second face of the first housing, and wherein the specified region of the first housing is formed on the second face of the first housing.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A remote control device comprising:
   a first housing;
   a first transmitter including a first infrared light source, configured to emit infrared light in a direction towards a first side of the first housing;
   a second transmitter including a second infrared light source, configured to emit infrared light in a direction towards a second side of the first housing;
   a window configured to cover at least part of the first transmitter and to transmit the infrared light emitted by the first transmitter therethrough;
   a window button configured to cover at least part of the second transmitter and to transmit the infrared light emitted by the second transmitter therethrough; and
   a second housing couplable with the first housing,
   wherein
   the second housing includes a hole to receive the window button therein so that when the first housing is coupled with the second housing, the window button secures the coupling of the first housing and the second housing, and when the window button is separated from the hole, the first housing and the second housing are separable from each other,
   at least a portion of the window button protrudes outside the second side of the first housing and is exposed outside the second housing,
   the second housing covers a part of the first housing when the at least a portion of the window button is inserted into the hole, and
   the at least a portion of the window button is separated from the hole, and the second housing exposes the part of the first housing to the outside when the at least a portion of the window button is pressed.

2. The remote control device of claim 1,
   wherein the window is coupled to the first side of the first housing,
   wherein the window button is provided in the second side of the first housing, and
   wherein the second housing is configured to expose at least a portion of the window and at least a portion of the window button outside the second housing.

3. The remote control device of claim 1, wherein the first housing includes space to receive a battery,
   wherein the space is covered by the second housing when the window button is received in the hole, and
   wherein at least part of the space is open when the window button is separated from the hole.

4. The remote control device of claim 1,
   wherein the second housing includes a closed space where a part of the first housing is received therein when the first housing is coupled with the second housing, and an opened space where a part of the first housing is exposed when the first housing is coupled with the second housing.

5. The remote control device of claim 1, further comprising:
   a keypad member coupled with a third side of the first housing,
   wherein the first side is a top side of the first housing,
   wherein the second side is a rear side of the first housing, and
   wherein the third side is a front side of the first housing.

6. The remote control device of claim 1,
   wherein the window button includes at least one protrusion on an inner side of the window button,
   wherein the remote control device further comprises at least one elastic member mounted on the at least one protrusion, and
   wherein each elastic member supports the window button to allow the at least a portion of the window button is inserted into the hole when the at least a portion of the window button is received in the hole, and
   the at least one elastic member is compressed to allow the at least a portion of the window button is separated from the hole of the second housing when the at least a portion of the window button is pressed.

7. The remote control device of claim 6, wherein a support member is formed inside the first housing, the support member being configured to prevent a movement of the at least one elastic member.

8. The remote control device of claim 1, further comprising:
   a push member disposed on a third side of the first housing,
   wherein the push member is configured to push the second housing in a direction towards the first side of the first housing.

9. The remote control device of claim 1, further comprising:
   a first guide member disposed on at least one side of the first housing; and
   a second guide member disposed on at least one side of the second housing,
   wherein one of the first guide member and the second guide member includes a groove formed in a first direction,
   wherein another of the first guide member and the second guide member includes a protrusion formed in the first direction, and
   wherein the first guide member and the second guide member provide a structure to guide sliding of the first housing in the direction towards the first side of the first housing, when the window button is separated from the hole.

10. The remote control device of claim 9, further comprising:
    at least one stopper disposed on at least one of the first housing and the second housing,
    wherein the at least one stopper is configured to allow the first housing to slide within a specified distance.

11. The remote control device of claim 1, wherein the second housing is configured to surround the second side of the first housing, and
   wherein a part of the first housing is formed on the second side of the first housing.

12. A display system comprising:
   a display device including a display; and
   a remote control device configured to remotely control the display device,
   wherein the remote control device includes:
   a first housing;
   a first transmitter including a first infrared light source, configured to emit infrared light through a first side of the first housing;
   a second transmitter including a second infrared light source, configured to emit infrared light through a second side of the first housing;
   a window configured to cover at least part of the first transmitter and to transmit the infrared light emitted by the first infrared light source therethrough;
   a window button configured to cover at least part of the second transmitter and to transmit the infrared light emitted by the second infrared light source therethrough; and
   a second housing couplable with the first housing,
   wherein
   the second housing includes a hole to receive the window button therein so that when the first housing is coupled with the second housing, the window button secures the coupling of the first housing and the second housing, and when the window button is separated from the hole, the first housing and the second housing are separable from each other,
   at least a portion of the window button protrudes outside the second side of the first housing and is exposed outside the second housing,
   the second housing covers a part of the first housing when the at least a portion of the window button is inserted into the hole, and
   the at least a portion of the window button is separated from the hole, and the second housing exposes the part of the first housing when the window button is pressed.

13. The display system of claim 12, wherein the window is coupled to the first side of the first housing,
   wherein the window button is provided in the second side of the first housing, and
   wherein the second housing is configured to expose at least a portion of the window and at least a portion of the window button to the outside the second housing.

14. The display system of claim 12, wherein the first housing includes space to receive a battery,
   wherein the space is covered by the second housing when the window button is received in the hole, and
   wherein at least part of the space is open when the window button is separated from the hole.

15. The display system of claim 12, further comprising:
   a keypad member coupled with a third side of the first housing,
   wherein the first side is a top side of the first housing,
   wherein the second side is a rear side of the first housing, and
   wherein the third side is a front side of the first housing.

16. The display system of claim 12, wherein the window button includes at least one protrusion on an inner side of the window button,
   wherein the remote control device further comprises at least one elastic member mounted on the at least one protrusion, and
   wherein the elastic member supports the window button to allow at least one portion of the window button is inserted into the hole when the at least a portion of the window button is received in the hole, and
   the at least one elastic member is compressed to allow the at least a portion of the window button is separated from the hole of the second housing when the window button is pressed.

17. The display system of claim 16, wherein a support member is formed inside the first housing, the support member being configured to prevent a movement of the elastic member.

18. The display system of claim 12, further comprising:
   a push member disposed on a third side of the first housing,
   wherein the push member is configured to push the second housing in a direction towards the side of the first housing.

* * * * *